UNITED STATES PATENT OFFICE.

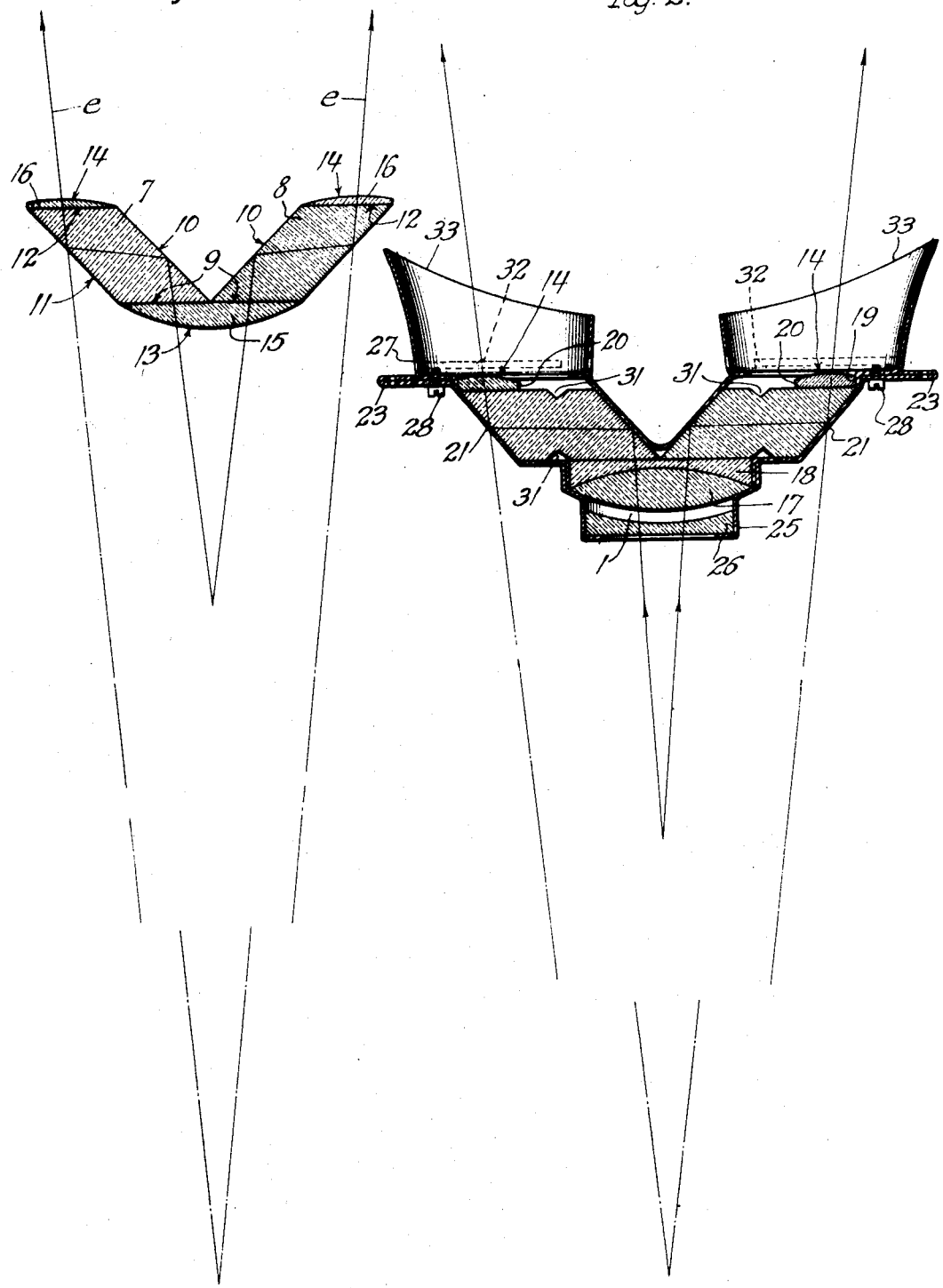

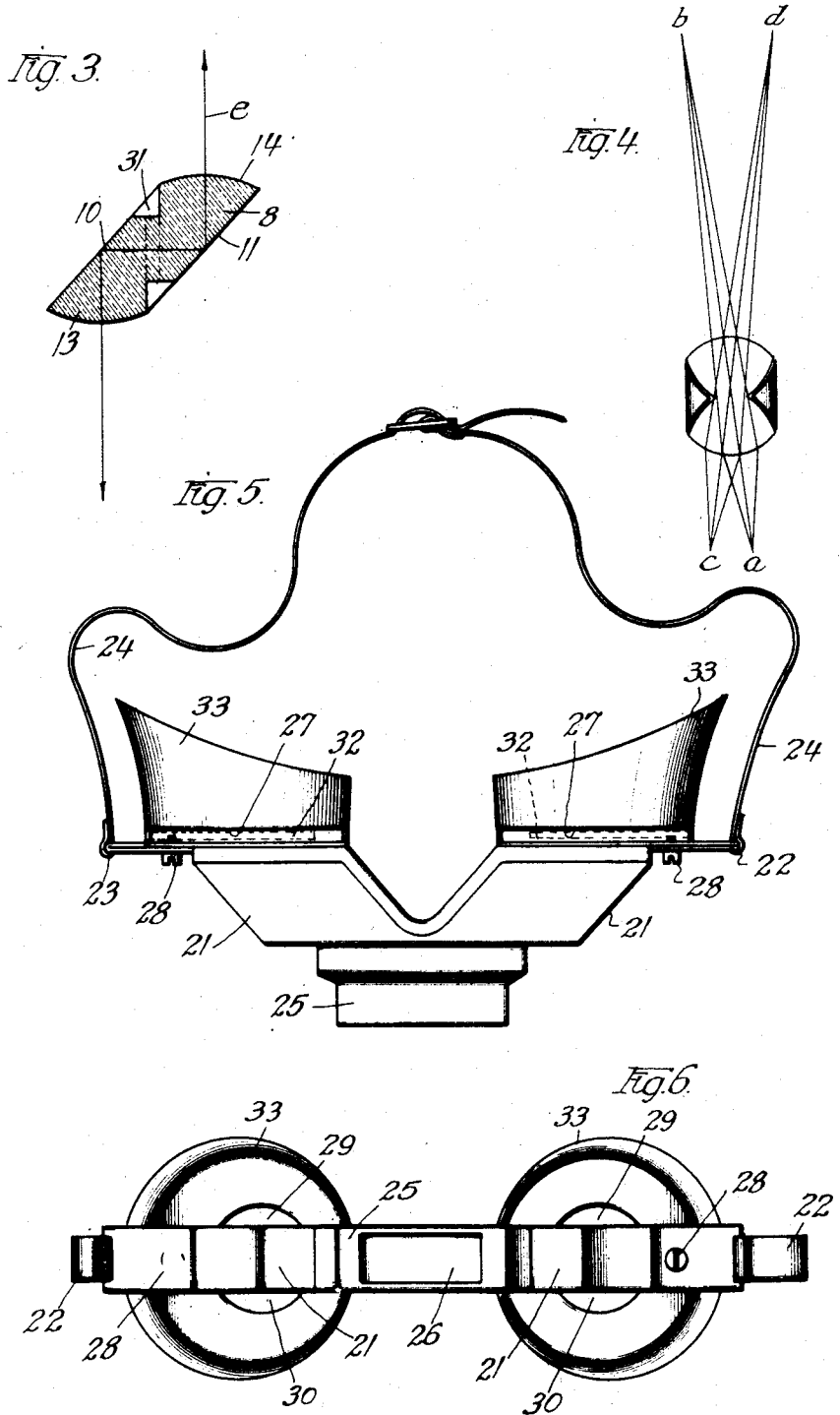

CHARLES J. TROPPMAN, OF CHICAGO, ILLINOIS, ASSIGNOR TO F. A. HARDY & COMPANY, OF CHICAGO, ILLINOIS, A CORPORATION OF ILLINOIS.

BINOCULAR-MAGNIFIER.

1,240,905.  Specification of Letters Patent.  Patented Sept. 25, 1917.

Application filed April 9, 1917. Serial No. 160,698.

*To all whom it may concern:*

Be it known that I, CHARLES J. TROPPMAN, a citizen of the United States, and a resident of the city of Chicago, county of Cook and State of Illinois, have invented certain new and useful Improvements in Binocular-Magnifiers, of which the following is a specification.

My present invention has relation to the provision of an improved "binocular magnifier" and the objects that I have had in view are the provision of such an instrument which is subject to a minimum of distortion in any position it may be held with reference to the object and which therefore may be moved during observation without affecting the magnification, the clearness of vision or the apparent position of the object. I have also found that the giving of the emergent rays a slight divergence which approximates the divergence which would come to the eyes from an object at a good distance for near vision, not only is agreeable and restful to the eyes, but considerably heightens the plastic or relief effect, which is a characteristic of binocular vision. I have also provided my binocular magnifier with diaphragms which further reduce the aberrations and enhance the clearness of definition.

It will be seen from the following description and the illustrative drawings accompanying it, that my invention may be regarded as an extension of the principles embodied in the magnifier attributed to Sir David Brewster, which is generally known as the "Coddington lens," (illustrated for a convenient reference in Figure 4 of the drawings), and the combination of these principles with the prisms employed by Mr. Wenham and others in securing binocular magnification. The usual form of the Coddington lens is a cylindrical section of a sphere, between the spherical or lenticular surfaces of which is usually provided a constricted or reduced portion, the sides of which are blackened to form a diaphragm. This structure being symmetrical, its position with respect to the object under observation is of slight importance as diagonal rays are focalized the same as rays which pass through it parallel with its optical axis; in fact, its optical axis may be any diameter passing through the respective spherical or lenticular surfaces.

With the Wenham prisms, whether the magnifying element be disposed in front of the prisms as an objective or behind the prisms as eye-pieces, it is necessary, if distortion is to be avoided, to maintain the surface or surfaces at which the light enters or leaves or enters and leaves the prisms at right-angles to the direction of the rays, in order to obviate the refraction which is incident to the passage of the rays to or from the prism at any other than a right-angle with the surface thereof.

I attain the above mentioned objects by means of the structure illustrated in the accompanying drawing, in which,—

Fig. 1 is a sectional view of one form of binocular magnifier embodying my invention.

Fig. 2 is a sectional view of a form of binocular magnifier slightly modified from that shown in Fig. 1, and in this view I have shown schematically the path of the light or operation of the optical elements of the device.

Fig. 3 is a view of a further slightly modified form of prism-lens.

Fig. 4 is an illustrative schematic view of the operation of a Coddington lens.

Fig. 5 is a top view or plan of a suitable frame mounting or casing in which the optical elements of my binocular magnifier may be conveniently mounted; and Fig. 6 is a front view of the structure shown in Fig. 5.

Similar reference characters refer to similar parts throughout the several views.

In examining an object under magnification, its relation to or distance from the eyes is so close that both eyes cannot be easily directed at it at once. In order to separate the rays from such a near object so that both eyes may receive the rays at a suitable angle for observation, I employ oblique prisms, 7, and 8, as shown in Fig. 1. Light entering the anterior surface, 9, of such prism is reflected from the oblique surface, 10, to the opposite oblique surface, 11, and from thence is reflected through the posterior surface, 12. When two such prisms are arranged with their anterior and posterior surfaces in alinement and their oblique surfaces converging, the rays from the object reach the eyes in the same manner as if the object were in alinement with the emergent rays e and may be comfortably examined.

With the prisms alone, as before noticed, refraction would occur at the anterior and posterior surfaces in connection with all rays oblique thereto, and to obviate this refraction I have combined with both the anterior and posterior ends of the prisms spherical elements, 13 and 14, most simply shown in Fig. 3. The presence of the spherical anterior and posterior elements, 13, and 14, incorporates in the prisms the principles of the "Coddington lens," as the reflections from the oblique surfaces are regular and the only effect they have is to lengthen the path of light between the lenticular surfaces or to create a condition similar to a spherical section having a diameter of equal length to the path of light through the prisms. In the schematic view of the "Coddington lens" in Fig. 4, it will be seen that any diameter, $a$—$b$ or $c$—$d$ passing through the respective spherical surfaces may be regarded as an optical axis and no distortion or aberration will occur on account of obliquity of the incidence of the light.

In this connection it should be noted that while the typical "Coddington lens" is one in which the spherical surfaces are equal and symmetrical, or are opposite surfaces of the same sphere, the practical advantages of this arrangement can be obtained to any desired degree by a proportional approximation to such a typical condition.

The spherical elements may be provided either by grinding them on to the anterior and posterior portions of the prism, as shown in Fig. 3, or they may be ground on separate pieces of glass, 15 and 16, as shown in Figs. 1 and 2, and either cemented to the prisms or set rigidly in the frame or mounting in proper relation to the prisms. The cementing of the spherical elements to the prisms has certain theoretical advantages, at least, as certain surface diffusions would be eliminated thereby.

The arrangement of a single continuous objective or anterior spherical element, in front of both prisms, as shown in Figs. 1 and 2, has the advantage of noticeably increasing the field. In Fig. 2, the anterior spherical element is an achromatic doublet formed of the elements, 17 and 18, but while this secures the elimination of some color in the image, it does not alter the operation of the principles heretofore referred to.

While the relief or plastic effect of binocular vision is generally attributed to the parallax and the eyes are theoretically under less strain when subject to light approximating parallelism, I have, nevertheless, found that it is more agreeable to the eyes and the relief or plastic effect is enhanced by giving to the emergent rays such a divergence as would be produced from an object at a position for good near vision. This result may be entirely psychological. A simple and efficient means, however, for securing the desired divergence of the emergent rays is to decenter the posterior spherical elements, 14, as clearly shown in Fig. 2, where it will be noticed that the outer edges, 19, of these elements are thicker than the inner edges, 20, which produces the prismatic condition necessary in securing the requisite divergence. With the form of binocular magnifier herein shown, may also be advantageously employed a diaphragming slot or slots, 31, which may take the form of the notches shown in Fig. 3 or those shown in Fig. 2.

The optical elements heretofore described are preferably mounted in such a frame or mounting as is shown in Figs. 5 and 6, in which a metallic casing, 21, of a suitable metal, aluminum having the advantage of lightness, surrounds the sides of the prisms and the edges of the anterior and posterior spherical elements. Lateral lugs, 22 and 23, extend from either end of the casing 21, and to these lugs is secured the head-band, 24, which retains the magnifier in suitable position before the eyes. A lens cell, 25, is provided, which will assemble with the portion of the casing, 21, which surrounds the anterior spherical element, in which cell may be mounted any desired auxiliary modifying lens, such as the negative lens, 26, as shown in Fig. 2. Just to the rear of the position of the posterior spherical elements, the casing, 21, is provided with lens cells, 27, into which may be inserted lenses 32 having the operator's particular correction, and these lenses may be rigidly secured in position by means of the set screws, 28, the inner ends of which extend into the lens cells, 27. To the rear of the lens cells, 27, are provided eye cups, 33, the rear edges of which are shaped to conform to the face about the eyes. The forward portions of the eye cups, 33, preferably open both above and below, as well as upon the posterior spherical elements. This arrangement is clearly shown in Fig. 6, and the upper and lower openings, 29, and 30, in the eye cups are for looking either above or below the magnifying elements, so as to be able to locate the object or a tool, without removing the magnifier from the head.

What I claim as new is:—

1. A lens system comprising obliquely disposed prisms the anterior and posterior ends whereof lie in the same planes, a plano-convex spherical element having its plano side common to the anterior ends of said prisms, and separate plano convex spherical elements with their plano sides disposed adjacent the respective posterior ends of said prisms.

2. A lens system comprising opposite positive spherical elements approximating surfaces of the same radii having interposed therebetween reflecting elements whereby the light entering one of said spherical elements is reflected and caused to emerge from the other of said spherical elements and the path of the light shall approximate twice the radius of curvature.

3. A lens system comprising a positive spherical objective element, a pair of diverging prisms each having opposite oblique reflecting surfaces adapted to receive light entering through said spherical element and independent positive spherical elements arranged for the passage of light emergent from said respective prisms said last-mentioned positive elements being decentered whereby light emergent from said system will have the desired divergence.

4. A lens system comprising spaced positive spherical elements having interposed therebetween reflecting elements whereby light entering one of said spherical elements will be diverged so that it will emerge from the other of said spherical elements said last-mentioned spherical elements being decentered so as to cause the desired divergence of the emergent rays.

5. A binocular magnifier comprising a pair of prisms each having its anterior and posterior ends in parallel planes and opposite parallel longitudinal sides disposed at approximately forty-five degrees with respect to the end planes, said prisms being disposed with their parallel longitudinal sides converging and with their anterior ends in the same plane, a positive plano spherical lens element having the plano side thereof common to the anterior ends of said prisms, and separate plano spherical positive lens elements having their plano sides disposed parallel with and in coactive relation with the respective posterior ends of said prisms.

Signed at Chicago, county of Cook and State of Illinois, this 4th day of April, 1917.

CHARLES J. TROPPMAN.

Witness:
EDWARD S. CRAVEN.